(12) United States Patent
Gillespie

(10) Patent No.: US 10,803,531 B2
(45) Date of Patent: *Oct. 13, 2020

(54) SMART SENSORS FOR ROOF ICE FORMATION AND PROPERTY CONDITION MONITORING

(71) Applicant: Hartford Fire Insurance Company, Hartford, CT (US)

(72) Inventor: Richard P. Gillespie, East Hampton, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,324

(22) Filed: May 29, 2019

(65) Prior Publication Data

US 2019/0279307 A1 Sep. 12, 2019

Related U.S. Application Data

(63) Continuation of application No. 14/453,508, filed on Aug. 6, 2014, now Pat. No. 10,354,329.

(51) Int. Cl.
*G06Q 40/08* (2012.01)
*G08B 19/02* (2006.01)

(52) U.S. Cl.
CPC ............. *G06Q 40/08* (2013.01); *G08B 19/02* (2013.01)

(58) Field of Classification Search
CPC ................................ G06Q 40/08; G08B 19/20
USPC ............................................................ 705/4
See application file for complete search history.

(56) References Cited

U.S. PATENT DOCUMENTS

| | | | | |
|---|---|---|---|---|
| 4,936,060 A | * | 6/1990 | Gelinas | E04D 13/103 52/1 |
| 5,890,322 A | * | 4/1999 | Fears | E04D 13/0762 340/580 |
| 6,036,102 A | * | 3/2000 | Pearson | F24F 11/76 236/49.3 |
| 6,276,202 B1 | * | 8/2001 | Latarius | G08B 19/02 73/25.04 |
| 6,700,098 B1 | * | 3/2004 | Wyatt | E04D 13/0762 219/213 |
| 8,094,019 B1 | * | 1/2012 | Kelsch | G08B 13/1454 340/531 |
| 9,290,273 B1 | * | 3/2016 | Thompson | G05D 23/19 |

(Continued)

*Primary Examiner* — Lindsay M Maguire
*Assistant Examiner* — Michael J Warden
(74) *Attorney, Agent, or Firm* — Ference & Associates LLC

(57) ABSTRACT

Embodiments include a system providing sensor feedback for property condition monitoring, including: a plurality of sensors disposed in a roof structure of a property; the plurality of sensors providing output indicative of ice formation associated with the roof structure; a hub device that receives output from the plurality of sensors, the hub device detecting at least one sensor output indicative of ice formation and providing a notification regarding the ice formation; a computing device of an insurance carrier that receives the notification, the computing device updating a status of the property in an insurance carrier database in response to the notification; and a communication link between the plurality of sensors, the hub device and the computing device of an insurance carrier. Other aspects are described and claimed.

17 Claims, 7 Drawing Sheets

(56) References Cited

U.S. PATENT DOCUMENTS

| | | | |
|---|---|---|---|
| 2006/0192678 A1* | 8/2006 | Garabedian | G08B 21/20 340/605 |
| 2007/0164874 A1* | 7/2007 | Visser | G01M 11/081 340/686.1 |
| 2009/0265193 A1* | 10/2009 | Collins | G06Q 30/0185 705/4 |
| 2010/0031573 A1* | 2/2010 | Whiting | E05B 47/02 49/31 |
| 2012/0060902 A1* | 3/2012 | Drake | H02S 20/25 136/251 |
| 2013/0120306 A1* | 5/2013 | Furukawa | G06F 3/041 345/173 |
| 2014/0127017 A1* | 5/2014 | Virtanen | F03D 80/40 416/95 |
| 2015/0193881 A1* | 7/2015 | Emison | G06Q 40/08 705/4 |
| 2015/0356686 A1* | 12/2015 | Cook | G06Q 40/08 705/4 |

* cited by examiner

SMART SENSORS FOR ROOF ICE FORMATION AND PROPERTY CONDITION MONITORING

CROSS REFERENCE TO RELATED APPLICATIONS

This application is a continuation application of U.S. patent application Ser. No. 14/453,508, entitled SMART SENSORS FOR ROOF ICE FORMATION AND PROPERTY CONDITION MONITORING, filed on Aug. 6, 2014, the contents of which are incorporated by reference entirely herein.

BACKGROUND

Physical damage to insured properties is common. In many cases, the conditions giving rise to such damage may be difficult to notice using conventional mechanisms, e.g., visual inspections. For example, ice and snow damage typically associated with roof and related structures are on the raise.

Stakeholders dealing with the damage conditions, e.g., insurance companies and property owners would benefit from systems allowing these stakeholders to get out in front of the problem, reducing exposure to an increased threat. For example, with proper forecasting of potentially damaging conditions, certain damage may be avoided. Moreover, with improved forecasting capabilities, a high claims area may be predicted and appropriate resources allocated thereto in an efficient manner.

Certain property monitoring systems have been devised in the past, e.g., for monitoring snow build up on roofs, etc. Other remote management systems, for their part, offer remote control of properties, e.g., heating and cooling systems, security systems, etc. These systems aim to make property management easier for the property owners by supplying additional data to the property owners and allocating certain tools, e.g., remote control mechanisms, such that property owners may proactively manage their properties, even when remotely located.

BRIEF SUMMARY

In summary, an embodiment includes a system providing sensor feedback for property condition monitoring. The system may include a plurality of sensors disposed in a roof structure of a property, with the plurality of sensors providing output indicative of ice formation associated with the roof structure. The system may further include a hub device that receives output from the plurality of sensors, the hub device detecting at least one sensor output indicative of ice formation and providing a notification regarding the ice formation. In the system, a computing device of an insurance carrier receives the notification, with the computing device updating a status of the property in an insurance carrier database in response to the notification. The system is integrated, e.g., including a communication link between the plurality of sensors, the hub device and the computing device of an insurance carrier.

In a further embodiment, property condition(s) more generally may be monitored. For example, according to an embodiment a method of using sensor feedback for property condition monitoring is provided in which data derived from a plurality of sensors disposed in a property is received, with the plurality of sensors providing output indicative of a property condition. In an embodiment, at least one sensor output indicative of a changed sensor output is detected, and then a notification to an insurance carrier may be provided, with the notification indicating the changed sensor condition. Given changed condition information regarding the property, an embodiment may update a status of the property in an insurance carrier database in response to the notification.

Additional embodiments are described, including other methods, as well as devices/apparatuses, systems including multiple devices, and products.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
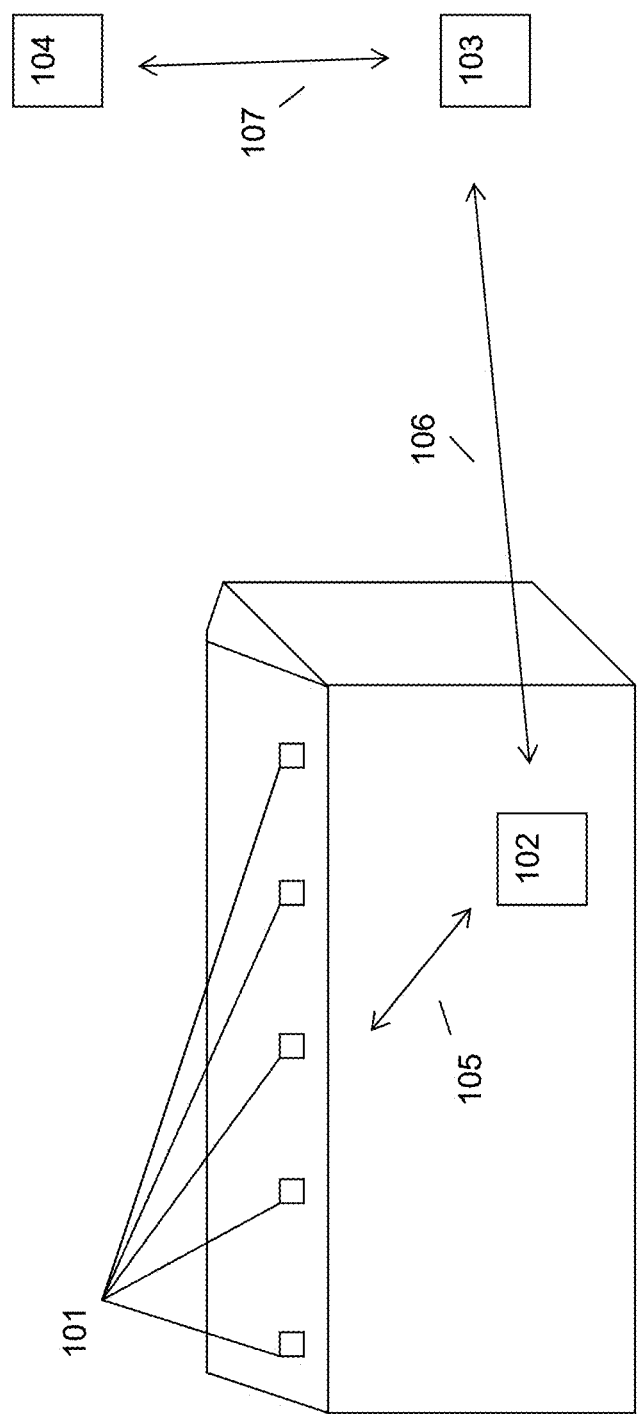
FIG. 1 illustrates an example system for roof and property condition monitoring.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The conventional systems noted herein are adequate for providing property owners with additional data and remote control over properties, but there is currently no link to integrate such systems and their data into insurance carriers' data collections systems. Doing so would provide material benefits for all involved, e.g., providing insurance discounts for property owners using monitoring systems, allowing for more appropriate forecasting of high claims areas, allowing for better resource allocation based on improved damage forecasts, etc. Additionally, a system should be compatible with other third party systems, e.g., able to determine what existing systems capabilities are and whether there is a need to include this data and/or to enhance it. A combined package of sensors coupled to processes for setting thresholds and determining multiple ways of alerting both property owners as well as insurance carriers can help avert claims.

Accordingly, in an embodiment, to integrate current and future smart home sensor products and systems, and enhance the same, an embodiment provides a bridge that interprets the wired and or wireless communications from smart home systems and transforms that information into informational packets that can be communicated to the insurance carriers systems. In addition to real time alerts, the insurance carrier would then have access to real time measurements and could utilize analytics to forecast and predict where high claim areas will be. This information can be useful for capital utilization, mobilization of claims services as well as to help structure future insurance coverage.

In an embodiment, the bridge may be implemented as a wireless hub device that is in a sense decoupled from (and not reliant on) specific smart home sensor systems. The bridge device will enable either internally provided or third party systems to communicate with an insurance carrier's data collections and customer communications services. The bridge device may be both remotely managed by insurance carrier and allow for the property owner to set and view specific values.

In an embodiment, a digital classification matrix may be created that details the properties characteristics. By way of example, in the case where roof condition is a monitored property condition, a building matrix may take into account such things such as pitch of the roof, surface area thereof, building material(s) used in its construction, as well as service intervals. This matrix may be customized for the sensors used and detail the location and quantity of sensors required or desirable, providing the optimal coverage for the roof structure.

The matrix may be configured remotely, e.g., in a bridge or hub device located in the property that is to be monitored, and the bridge device may communicate compliance information, sensed property condition information, etc., in either real time or intermittently, e.g., periodically in a batch mode. One example implementation consists of a small wireless hub that utilizes an INFORMATICA virtual data machine (VIBE engine) to transform the data from various proprietary systems and provide it to an insurance carrier's cloud infrastructure for real time alerts as well as for analytical use. INFORMATICA and VIBE are trademarks of Informatica Corporation in the United States and other countries.

The matrix provides a configurable grouping of characteristics that will be used, e.g., by the bridge device, to determine the basic configuration required by the specific smart home family of sensor products being used. For example, an ice damage monitoring product may require specific values for the actual property type. This may be configured on the bridge device and may be remotely managed, e.g., by an insurance carrier.

The bridge device thus enables communication with current and future smart home systems. The data gathered and used may drive customer communications. By providing a local interface between the bridge device and the property owner's device, e.g., mobile computer system such as a smart phone or tablet device, an embodiment can send local alerts detailing any properties in the local area that are experiencing issues as well as how the specific property in question is doing. By coupling this communication with social networks and other communication mechanisms an embodiment enables automatic notification of anyone the owner has programmed the bridge device to notify if an alarm is thrown. There may be an opportunity to use this data to inform other customers that are not currently enrolled, e.g., that issues are occurring locally, as determined through geographically co-located monitored properties, and that other properties, though not specifically monitored, may need to take action.

For customers that are not using more sophisticated smart home systems, an embodiment may include provisioning of low cost sensors, e.g., small clips or nails that attach to the roof tile and also to the home. These small sensors fire when they lose contact between the tile and the roof. This would alert the insurance carrier and property owner to both possible ice damage issues as well as wind damage issues. These sensors may consist of smart staples or nails that create a wireless alarm when they are compromised. The smart nails and staples are sensors that when compromised will communicate to bridge device. They may consist of a simple low powered circuit that when broken would fire a wireless alarm.

The present invention provides significant technical improvements to roof and property monitoring technology. The present invention is directed to substantially more than merely a computer implementation of a routine or conventional activity previously known in the industry as it significantly advances the technical efficiency, access and/or accuracy of roof and property monitoring technology by implementing a specific new method and system, including new sensor types, as defined herein. The present invention is a specific advancement in the area of roof and property monitoring technology as it provides technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention smart sensors are deployed in a structure, e.g., at particular locations, such that they may sense separation of roof components and report the same in a timely, efficient manner. This permits, among other technical benefits, an appropriate amount and type of data to be retrieved regarding roof and other property structure conditions. In turn, this advances the ability of an insurance carrier to make technical decisions regarding the property, its condition, and appropriate handling thereof based on the sensor data.

The illustrated example embodiments will be best understood by reference to the figures. The following description is intended only by way of example, and simply illustrates certain example embodiments.

FIG. 1 illustrates an example system for roof and property condition monitoring. In the example system illustrated in FIG. 1, a plurality of sensors 101 may be disposed in a roof structure of a property. The plurality of sensors 101, e.g., smart nails or staples, sense separation in the roof structure layers in which they are situated, and provide output indicative for example of ice formation associated with the roof structure, e.g., in response to physical separation between a tile or shingle and underlying roof structure.

Figure 2A:
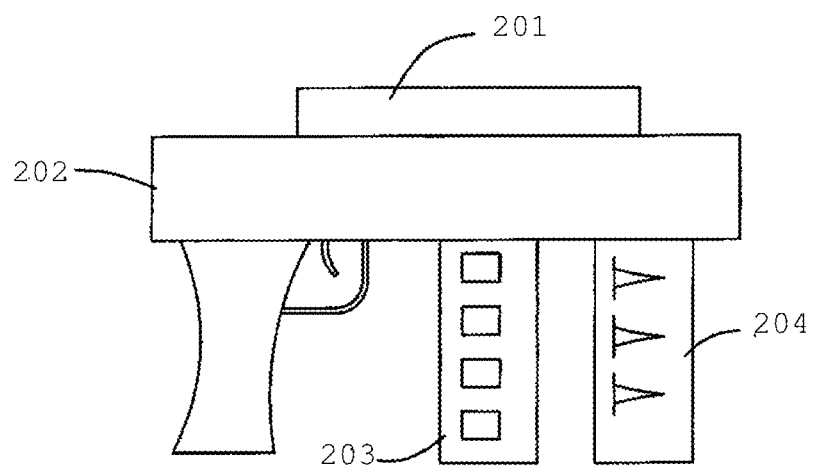
FIG. 2A illustrates an example sensor installation tool.

Referring to FIG. 2A, an example application or installation tool 202 for installing smart sensors is illustrated. The installation tool 202 includes an embedded or attachable (connectable) computing device 201 with an interface, e.g., LCD of an attached smart phone. A mechanism provides application force, e.g., pneumatic or spring pressure applicator, for setting the nail and applying or attaching the smart sensor thereto. The smart nails may be set and the smart sensors may be attached to set smart nails by use of a sensor cartridge 203 and a nail cartridge 204 provided with application tool 202. By way of example, when a smart nail is set using the application tool 202, then a smart sensor may be attached thereto.

Figure 2B:
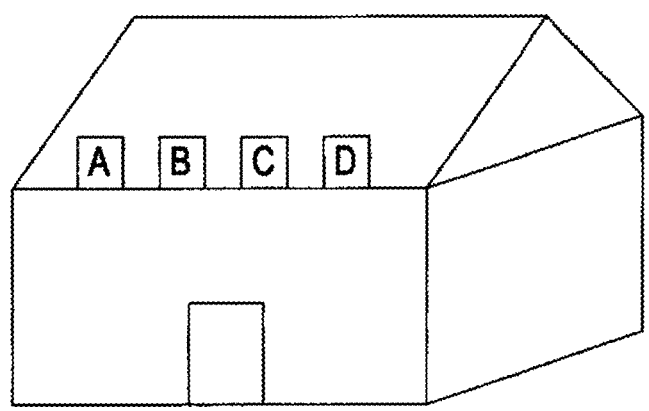
FIG. 2B illustrates an example of installed smart sensor locations.
Figure 5:
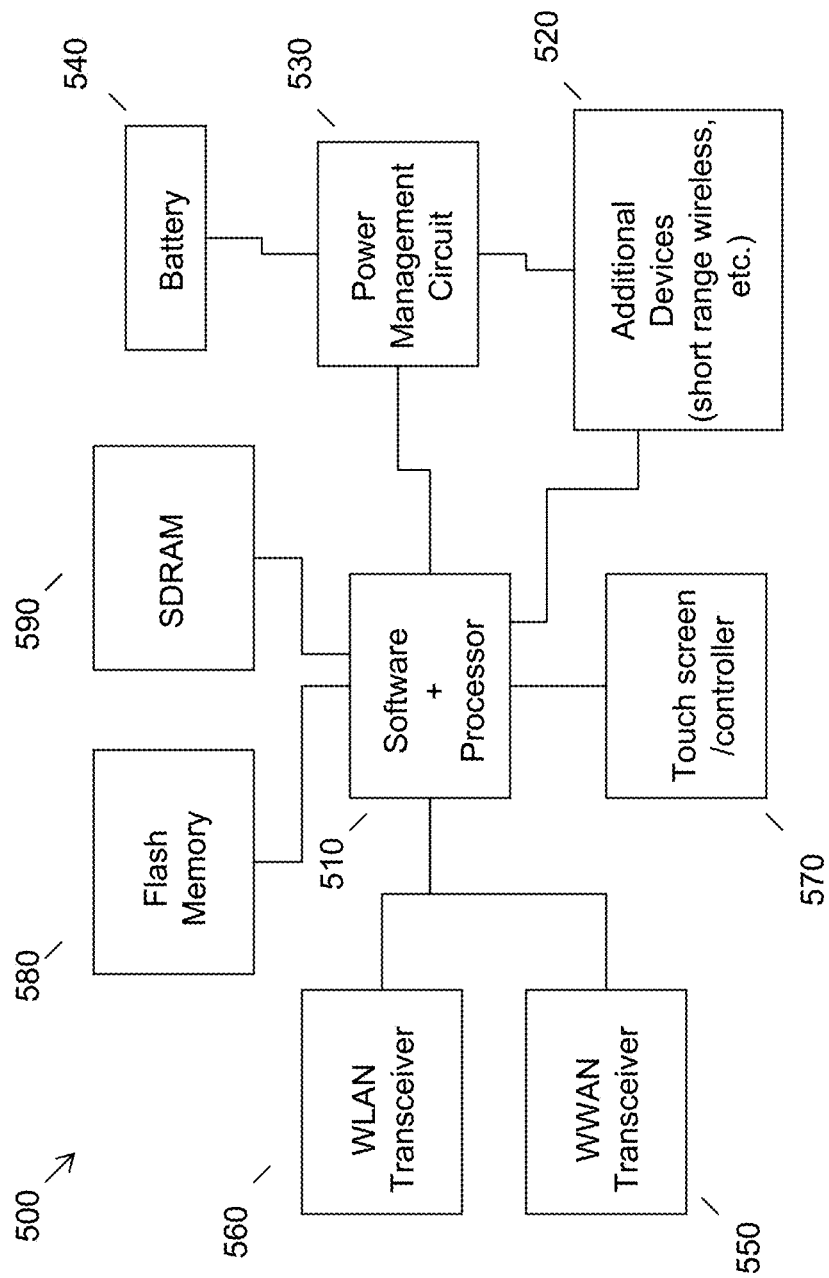
FIG. 5 illustrates an example of computer circuitry.

A computing device 201, for example as outlined in FIG. 5, may be utilized to identify the location of the smart sensor, e.g., within the roof structure (refer to FIG. 2B). For example, a user may install a smart nail into the roof and then enter its location by manually identifying the location of the sensor on an image overlaying the roof structure provided by LCD in an input interface of a computing device 201. Also, the sensor positions may be determined automatically or semi-automatically by use of GPS or other location service technology that correlates a geographic location to the sensor's placed location. This serves to uniquely identify the smart sensors and provides information regarding their relative locations.

The smart nails may be applied to various positions of a roof structure, e.g., in positions "A," "B," "C," and "D" as illustrated in FIG. 2B. As may be appreciated, appropriate placement of the smart sensors in the structure may be chosen given the type of smart sensor used, the type of structure being monitored, the condition being monitored, etc. In the example of FIG. 2B, smart nails are placed near the edge of the roof structure in positions "A," "B," "C," and "D" such that the most likely place for ice buildup is monitored.

Figure 3:
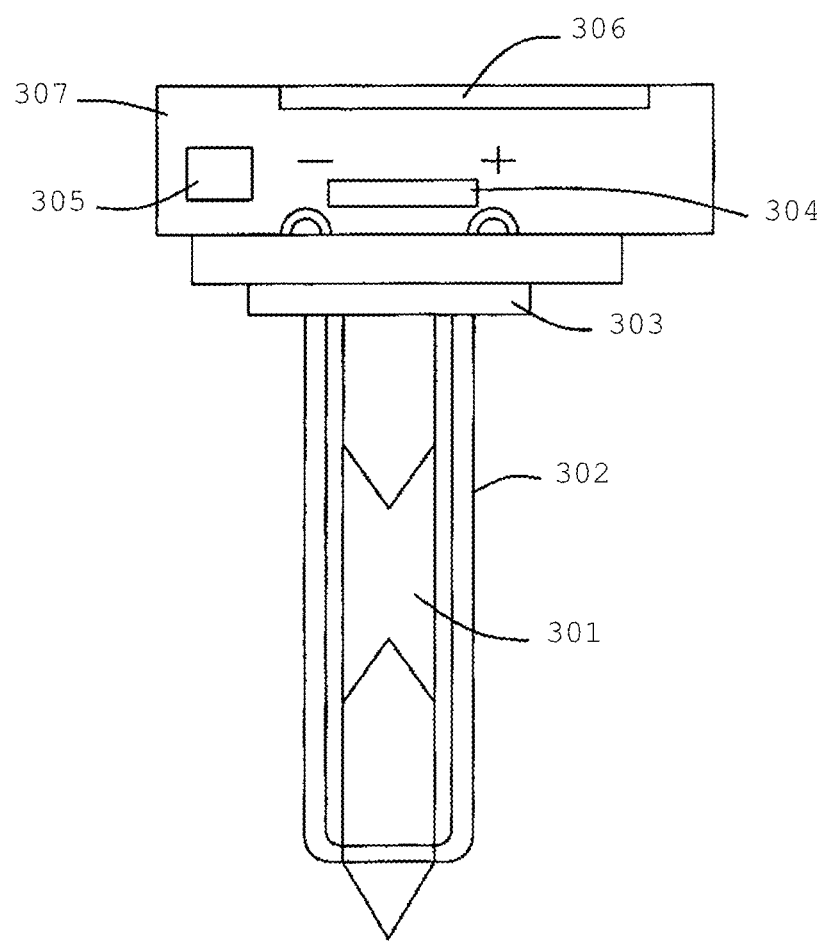
FIG. 3 illustrates in a cross sectional view an example smart sensor in the form of a nail break sensor.

FIG. 3 for its part illustrates in a cross sectional view an example of a nail break sensor contained in a housing 307, such as may be set into a roof structure at positions "A," "B," "C," and "D" of FIG. 2B. A semi-cut nail 301 provides downward stability for installation but is set to allow upward force to break or deform it. A contact, e.g., wire 302, is set appropriately, e.g., along the side(s) of the nail 301, making a circuit via the contact. A head of the nail 303 includes a malleable part, e.g., a washer material or the like, that provides protection against water leaks. A meter 304, e.g., an ohm meter, and logic or circuitry (logic chip) senses a break in the contact or circuit, e.g., as may occur due to ice build up expanding a top roof element or tile away from underlying roof structure into which the nail 301 is set. One or a combination of powering mechanisms may act to power the sensor, e.g., a battery and/or a solar panel.

Figure 4:
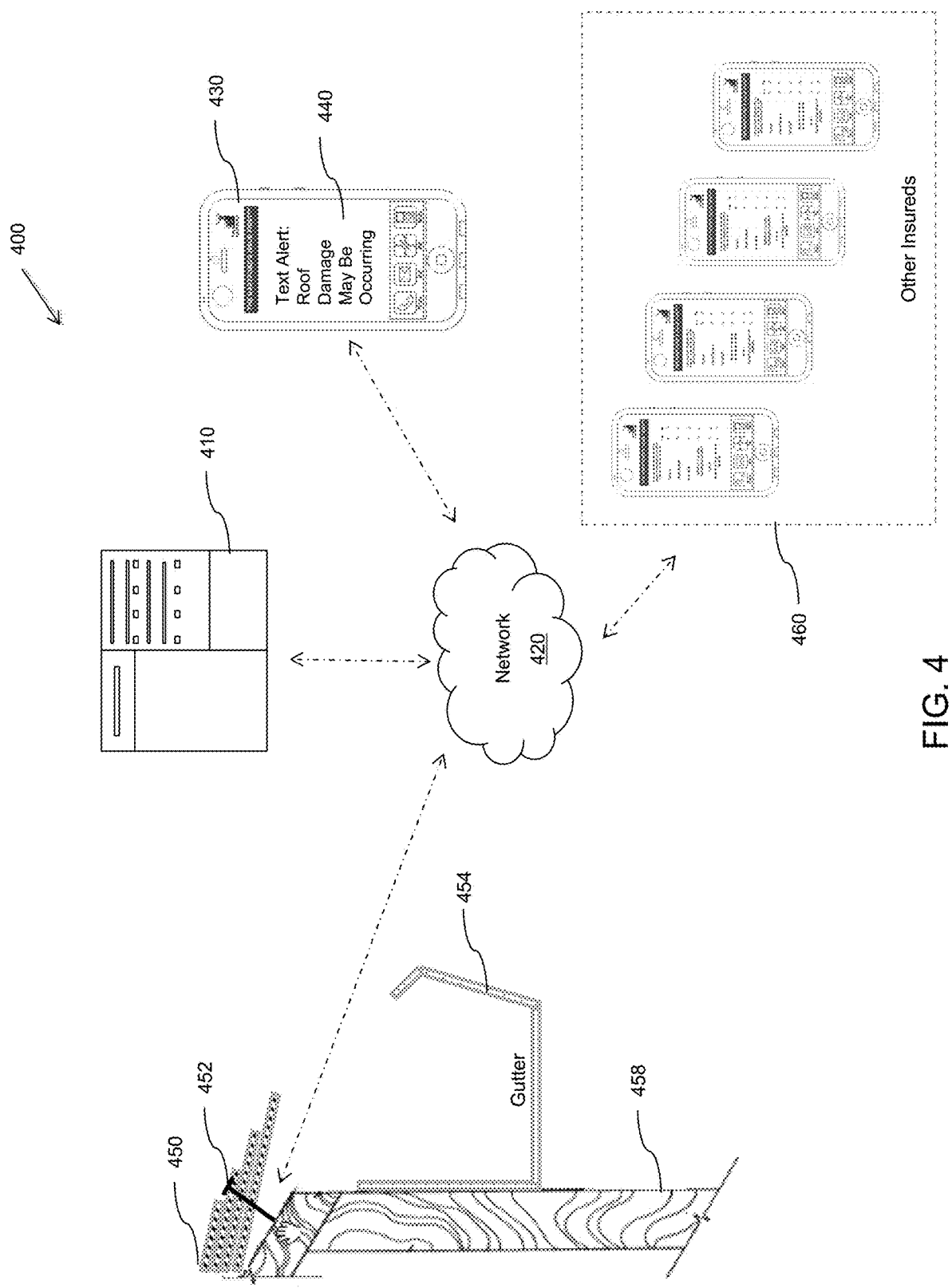
FIG. 4 illustrates an example roof monitoring system.

As shown in FIG. 4, a system 400 includes a plurality of smart sensors such as a smart nail 452 disposed such that it connects an upper 450 and lower 458 section of a roof structure. An example installation point for such a smart nail 452 is again near a lower edge of the roof where ice build up frequently occurs, i.e., near a gutter 454. In response to separation of upper 450 and lower 458 roofing sections or layers, the smart nail 452 produces an output, where the output may vary depending on the degree of separation, e.g., cause by a small amount of ice build up or a larger amount of ice build up.

In this regard, depending on the degree of separation between upper 450 and lower 458 sub sections of the roof structure, the smart nail 452 may communicate different data. Thus, the smart nail 452 may report loss of contact between upper 450 and lower 458, may report breaking of the smart nail 452, i.e., indicating a degree of thickness of the ice build up. Smart nail 452 thus communicates data regarding separation between upper 450 and lower 458 roofing sections, e.g., via a network 420, to other devices, e.g., a computing device of an insurance carrier 410 or a cloud based device.

The receipt of such sensor data from a smart nail 452 is managed, e.g., by device 410 (and as further described herein), such that alert(s) may be generated and delivered, e.g., via network 420, to a variety of other parties and entities, e.g., to mobile devices thereof. For example, an alert application 440, here illustrated as implemented as a smart phone application, may include an alert 440 providing data matching a particular condition or pattern associated with the data received from the smart nail 452. Likewise, the alert or alerts may be communicated to various other applications of other devices, e.g., as illustrated at 460, such as to mobile devices of other insureds.

Referring back to FIG. 1, a bridge or hub device 102 receives output from the plurality of sensors 101, with the hub device detecting at least one sensor output indicative of ice formation and providing a notification regarding the ice formation. A computing device 103 of an insurance carrier receives the notification.

The computing device 103 may thus update a status of the property in an insurance carrier database 104 in response to the notification. Communication links 105, 106, and 107 between the plurality of sensors 101, the hub device 102, the computing device of an insurance carrier 103, and the database 104 (if a separate database is used), allow the system components to communicate data. It is worth noting that the devices, e.g., the computing device of an insurance carrier 103 and the database 104 may be consolidated to a single device. Moreover, specific processing examples given in this description may occur on a single device or may be completed in a distributed fashion. Additionally, the communication links may be wired or wireless links, e.g., depending on the types of devices utilized.

The computing device of an insurance carrier 103 uses the status of the property in the insurance carrier database 104 to forecast high claims geographic areas. For example, if data retrieved from the sensors 101 indicates that a given property is experiencing ice damage, and this in turn reflects a trend with geographically co-located properties as reflected in the database 104, the computing device 103 may assign the geographic area a status of high risk for ice damage.

The computing device of an insurance carrier 103 may also use the forecasted high claims geographic areas to identify one or more properties situated therein and lacking a plurality of sensors disposed in a roof structure. Thus, even if a property listed in the database 104 does not include sensors 101, it may nonetheless be identified on the basis of its geographic location.

The computing device of an insurance carrier 103 may use the notification to provide an alert. For example, the alert may be transmitted, using a communication link such as 106, to a property owner device. The property owner device may be for example the hub device 102 or another device, e.g., a mobile computing device such as a smart phone of the property owner registered with the hub device 102 or otherwise associated with the property.

As described herein, the hub device 102 may include a communication interface for third party data input. By this it is meant that existing smart home systems, e.g., security systems, heating and cooling systems, etc., may already exist in the property. Thus, the hub device 102 is provided with a capability to interface with other devices (e.g., using a wired and/or wireless connection) such that data from third party systems may be accessed and utilized in a similar fashion as is data derived from sensors 101. In this regard, the hub device 102 may be programmed to transform data obtained form third party systems/devices such that when it is communicated to an insurance carrier device 103 the data is of suitable format for inclusion in insurance carrier systems, e.g., database 104. Again, other device(s) may complete the data transformation (such that any is necessary). For example, the computer system of the insurance carrier 103 may transform the data or the data may be transformed in the third party system if a common or standard data format has been utilized by the third party system(s). Thus, a communication interface of the hub device 102 receives data from third party sensors monitoring other property characteristics and the hub device 102 reports the other property characteristics to the computing device of an insurance carrier 103.

In an embodiment, compliance with a particular program may be monitored by the system. For example, the hub device 102 may use the communication link 105 to monitor the plurality of sensors 101, e.g., for operability. The hub device 103 may therefore determine an operability characteristic via monitoring of the plurality of sensors 101 and provide an operability notification in response to determining the operability characteristic indicates that at least one sensor is not operating. The operability notification may for example be communicated by the hub device 102 to the computing device of an insurance carrier 103 for compliance monitoring. Thus, the insurance carrier will be apprised of the operating condition of the monitoring system. The computing device of an insurance carrier 103 may use the operability notification to update the status of the property in an insurance carrier database 104, e.g., as part of or excluded from a compliant group or pool of properties. Such compliance information may be used, e.g., by the computing device of an insurance carrier 103, to provide an alert in response to the operability notification. The alert may be transmitted, e.g., using a network link 106, to a property owner device. Additionally or in the alternative, such compliance information may be used for internal metrics by the insurance carrier.

In terms of the insurance carrier 103, as well as other data processing systems, while various other circuits, circuitry or components may be utilized in computing devices, an example illustrated in FIG. 5 includes a system design found for example in tablet or other mobile computing platforms. Such circuitry may be used in a bridge or hub device, as described herein, and/or may also be used in a computing device of an insurance carrier.

Software and processor(s) are combined in a single unit 510. Internal busses and the like depend on different vendors, but essentially all the peripheral devices (520) may attach to a single unit 510. The circuitry 500 combines the processor, memory control, and I/O controller hub all into a single unit 510. Also, systems 500 of this type do not typically use SATA or PCI or LPC. Common interfaces for example include SDIO and I2C.

There are power management circuits(s) 530, e.g., a battery management unit, BMU, which manage power as supplied for example via a rechargeable battery 540, which may be recharged by a connection to a power source (not shown). In at least one design, a single unit, such as 510, is used to supply BIOS like functionality and DRAM memory.

System 500 typically includes one or more of a WWAN transceiver 550 and a WLAN transceiver 560 for connecting to various networks, such as telecommunications networks and wireless Internet devices, e.g., access points. Additional devices 520 are commonly included. For example, additional devices may include short range wireless communication elements, e.g., a BLUETOOTH radio, for communicating with sensors of a distributed system in the home or property. Commonly, system 500 will include a touch screen/controller 570 for data input and display, e.g., entry of sensor locations into an image interface as described in connection with FIG. 2. System 500 also typically includes various memory devices, for example flash memory 580 and SDRAM 590.

Device circuitry, as for example outlined in FIG. 5, may be used in devices that are used by insurance carriers to collect data regarding property conditions. Circuitry such as that outlined in FIG. 5 may also be used by insurance carriers that receive data submissions, e.g., from a bride or hub device, as described herein. It will also be apparent that other circuitry than the non-limiting example outlined in FIG. 5 may be used.

Figure 6:
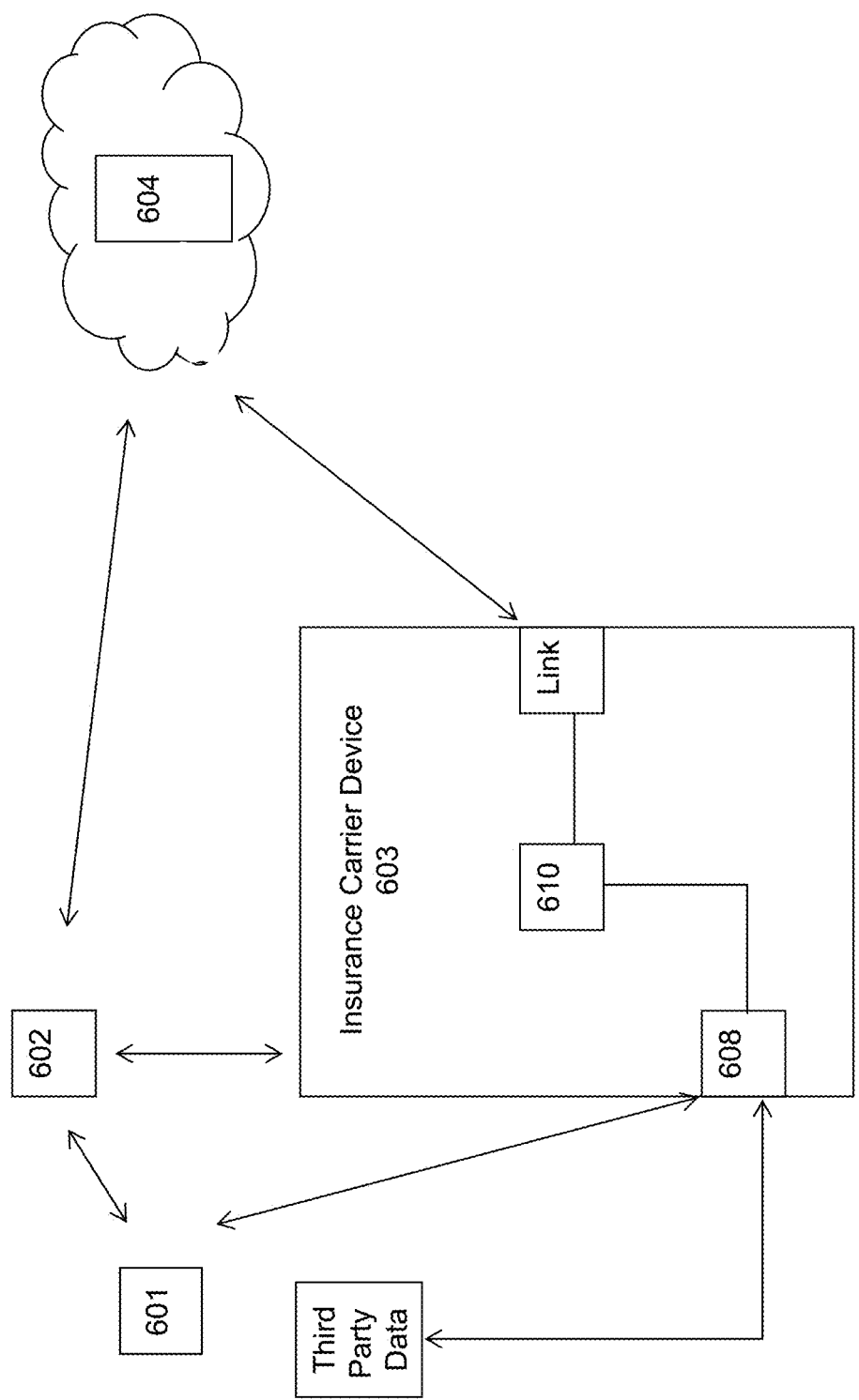
FIG. 6 illustrates an example insurance carrier computing device for roof and property condition monitoring.

FIG. 6 illustrates another example computing device of an insurance carrier 603 that uses sensor feedback for property condition monitoring. As illustrated, a link to an insurance carrier database 604, which as illustrated may be a cloud based or distributed database, is provided for storing information on insured properties. The link thus may be facilitated by a wired or wireless network connection component that facilitates local or remote network communication between the insurance carrier computing device 603 and the database 604. An input element 608 receives data derived from a plurality of sensors 601, e.g., disposed in a roof structure of a property, with the plurality of sensors 601 providing output indicative of ice formation associated with the roof structure (refer to FIG. 1). A processor and a memory 610 of the insurance carrier computing device 603 stores program instructions that when executed by the processor 610 detect at least one sensor output indicative of ice formation and updates a status of the property in the insurance carrier database 604 in response to the notification.

The computing device 603 may include program instructions that use the status of the property in the insurance carrier database 604 to forecast high claims geographic areas for various purposes. For example, the computing device 603 may include program instructions that use the forecasted high claims geographic areas to identify one or more properties situated therein and lacking a plurality of sensors disposed in a roof structure. By way of example, an insurance carrier database may include thousands to millions of data entries regarding a large number of properties. In this way, even properties not including the sensors 601 may be alerted to conditions in other properties, e.g., in the geographic area, experiencing damage conditions.

The sensor data received by the insurance carrier or other computing device 603 may process the sensor data in a variety of ways. For example, geographic regions of properties that may be at risk may be identified from received sensor data through correlation or association of properties within a given zip code, mile or distance radius, or the like, as may be complied from data listings of insured properties that may be consulted in addition to map or other third party data. An embodiment may use directly collected data regarding a property, e.g., GPS coordinates of houses stored in an insurance company's database, in this process as well. Such data may be used as variables to assist in refining a listing of properties initially identified using another variable, e.g., zip code location of the property.

Additionally, other variables may be utilized in determining if a notification or alert is to be issued to a given property or other entity, as well as which type of alert(s) to issue. By way of example, computing device 603 might utilize a variable such as the type of property or structure, e.g., roof pitch, materials, two or three story house, etc., in determining if the sensor data received regarding a property is indicative of mild ice build up, sever ice build up, actual damage to the roof structure, etc.

By way of specific example, a sensor or sensors may issue data associated with ice damage, e.g., a sensor output indicating that one or more smart nails have completely separated from a roofing structure, partially separated therefrom, etc. A number or pattern of such smart nail sensor data may be used in addition to other data to formulate an alert response. Thus, sensor data that is particularly indicative of ice damage, such as sensor data received from areas of a roof structure known to suffer ice build up or know to be of a type or location that commonly experiences ice build up, e.g., near a bottom edge of the roof structure, may be used to modify (increase or decrease) the alert level, its distribution area, select receiving parties or entities, etc.

As may be appreciated then, the computing device 603 may utilize a variety of data types, which may be of differing qualities with respect to forecasting, in making a determination that an alert, and what type of alert, should be issued. By way of specific example, a particularly strong indication of ice damage, such as smart nail break data received from a plurality of properties in a particular location, may not only cause a simple alert to be issued, but may also result in pre-emptive loss control communications taking place, e.g., such that employees or associated parties of an insurance carrier are alerted and may take appropriate actions. This may include communications to various fixed locations as well as to mobile communication devices of individuals involved in remediation activities. Thus, an initial alert may cause further automated communications to send loss control out to a site, alert agents, service providers, etc. As described herein, based on the type and/or quality of sensor data received, notifications at different levels, e.g., "red" versus "yellow", etc., may be issued.

As another example, if a small amount of sensor data received at the insurance carrier device indicates that a small number of properties, e.g., under a given threshold, have experienced moderate ice build up, as for example indicated by incomplete break data from smart nail sensors, a simple or lower level "yellow" alert may be issued, which causes communications to a property owner, an insurance agent thereof, etc., but does not notify remediation related parties and services. This may be contrasted to a more severe or higher level "red" alert, which may for example be issued when a larger number of properties in an area experience more significant ice build up, e.g., complete breaking of one or more smart nails in one or more properties of a particular type. Accordingly, an embodiment may automatically gauge the level of ice build up experienced in one or more properties and issue different alerts, which may be of varying type and/or quality, to various concerned parties and entities.

By way of the foregoing examples, it will be appreciated that the computing device 603 may further include program instructions that provide an alert in response to the notification, such as an alert transmitted to a property owner device, e.g., hub device 602. The computing device 603 may further include a communication interface, e.g., facilitated by input element 608, for third party data input. Thus, the communication interface, e.g., network communication element, etc., receives data from third party sensors monitoring other property characteristics and the third party data is used to update a status of the property in the insurance carrier database 604.

As described herein, the computing device 603 may monitor the plurality of sensors 601 with respect to operability. This permits the computing device 603 to determine an operability characteristic via monitoring of the plurality of sensors 601 and provide an operability notification in response to determining that the operability characteristic indicates that at least one sensor is not operating. Therefore, the computing device 603 may use the operability notification to update the status of the property in the insurance carrier database 604, e.g., to provide reporting metrics, provide an alert in response to the operability notification, etc.

As indicated in FIG. 6, various direct and indirect communication links may be utilized in the system. For example, the sensors 601 may directly communicate with an insurance carrier computing device 603 or the sensor data may be communicated directly to a cloud database 604 for later access. Likewise, the hub device 602 may directly communicate with the insurance carrier computing device 603 and/or or may communicate indirectly therewith, e.g., via a cloud device 604. Other communication links are of course possible.

Figure 7:
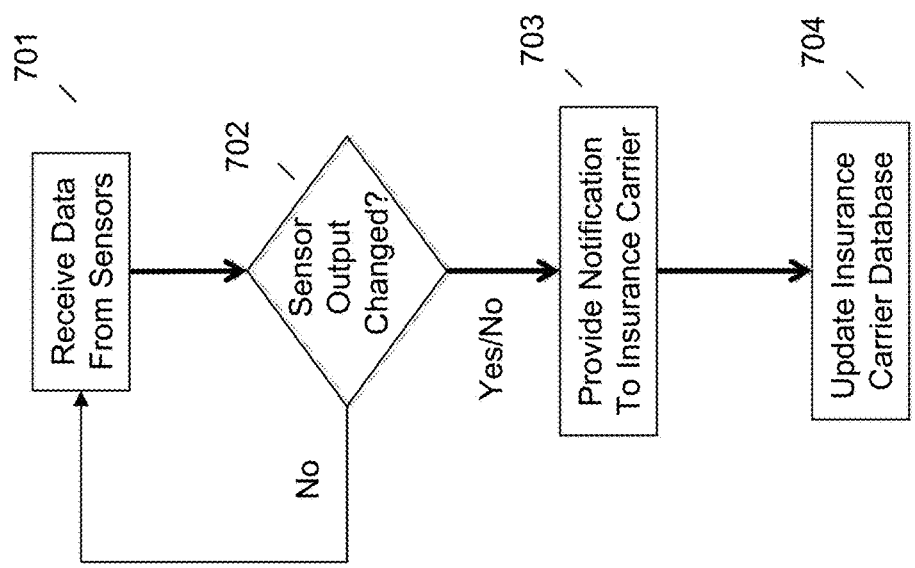
FIG. 7 illustrates an example method for property condition monitoring.

FIG. 7 for its part provides an overview of an example method of using sensor feedback for property condition monitoring. In the illustrated example, sensor data is received, e.g., over a short-range wireless network communication link, at 701. The data is derived from a plurality of sensors disposed in a property, e.g., roof sensors and/or third party sensors from other smart home systems. The sensors provide output indicative of a property condition, e.g., ice formation in a roof, temperature, etc.

The sensor data is examined, e.g., by hub device 102, to detect, using a processor of the device, at least one sensor output indicative of a changed sensor output at 702. For example, physical deformation via ice build up in a roof may physically deform a sensor device, disrupting or changing its output. If no change in output is detected at 702 for any of the sensors, the system may continue to monitor for changes. In an embodiment, as described herein, the fact that no sensor output has changed may itself be reported, e.g., as an indication of system operability and compliance.

In an embodiment, if sensor output has changed, as detected at 702, an embodiment provides, e.g., using an output device operatively coupled to a processor of the hub device 102, a notification to an insurance carrier at 703. The notification, as described herein, may indicate the changed sensor condition. The insurance carrier may thus update a status of the property in an insurance carrier database at 704 in response to the notification. This permits the insurance carrier to monitor compliance, monitor developing or existing damage conditions, as well as issuing notifications, both to the property issuing the sensor data and to other properties, e.g., geographically co-located, as indicated by an insurance carrier data set.

In an embodiment, the sensor data received at 701 may include third party data input regarding the property. This third party data, which may be transformed to a standard format for handling by an insurance carrier (locally and/or remotely), may likewise be used to monitor, via analyzing the third party data at 702, other property characteristics of the property for changed conditions (or lack thereof over time). Thus, an embodiment may report at 703 the other property characteristics to the insurance carrier.

As described herein, the sensor data from the plurality of sensors may be monitored at 702 to determine an operability characteristic. The result of the monitoring operation may be provided at 703 in an unprocessed form or as a preprocessed operability notification to an insurance carrier device. Such data again may prove useful in compiling compliance statistics, which in turn may be useful to insurance carriers for planning purposes.

For example, in connection with the sensor data used in monitoring and reporting changed conditions at the property, an embodiment may access a database storing information regarding other properties located within a geographic area in which the property is situated and provide a notification regarding the changed sensor condition at the property to at least one other property, e.g., at least one other property located within the geographically relevant area with respect to the property providing the sensor data. In this notification may be an indication regarding the proportion of properties using the monitoring system in the geographic area, the benefits thereof, etc.

In brief recapitulation, an embodiment provides for integration of smart home monitoring with insurance carrier data such that an insurance carrier may use the data for a variety of purposes. The uses of such monitoring data are many and include but are not limited to providing incentives for participating in monitoring programs, providing better management of resources such that they may be allocated to areas that are or are likely to be most effected by damage conditions, as well as facilitating communication between property owners and insurance carriers regarding the same.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system providing sensor feedback for property condition monitoring, comprising:
   a plurality of sensors disposed in a roof structure of a property and providing output indicative of ice formation on the roof structure, wherein the plurality of sensors comprise sensors that deform upon a physical separation of layers of the roof structure caused by the ice formation on the roof structure, the deformation of the sensors breaking a circuit of the sensors;
   a hub device that receives output from the plurality of sensors, the hub device detecting at least one sensor output indicative of ice formation, the at least one sensor output generated in response to the broken circuit and the hub device generating a notification regarding the ice formation;

the hub device sending the notification to a computing device of an insurance carrier, the notification of the hub device being formatted to allow the computing device of the insurance carrier to update a status of the property in an insurance carrier database based upon the notification; and a communication link between the plurality of sensors, the hub device and the computing device of an insurance carrier.

2. The system of claim 1, wherein the hub device includes a communication interface for third party data input.

3. The system of claim 2, wherein the communication interface receives data from third party sensors monitoring other property characteristics.

4. The system of claim 3, wherein the hub device reports the other property characteristics to the computing device of an insurance carrier.

5. The system of claim 1, wherein the hub device uses the communication link to monitor the plurality of sensors.

6. The system of claim 5, wherein the hub device:
   determines an operability characteristic via monitoring of the plurality of sensors; and
   provides an operability notification in response to determining the operability characteristic indicates that at least one sensor is not operating.

7. The system of claim 6, wherein the operability notification is communicated by the hub device to the computing device of an insurance carrier.

8. The system of claim 1, wherein at least one of the plurality of sensors measures contact between an upper and lower section of the roof structure.

9. The system of claim 1, wherein the at least one of the plurality of sensors measures an amount of separation between an upper and lower section of the roof structure.

10. The system of claim 1, wherein locations of the plurality of sensors within the roof structure are mapped.

11. The system of claim 10, wherein the locations of the plurality of sensors within the roof structure are communicated to the computing device of the insurance carrier.

12. A computer implemented method of using sensor feedback for property condition monitoring, comprising:
   receiving, over a network communication link, data derived from a plurality of sensors disposed in a roof structure of a property and providing output indicative of ice formation on the roof structure, wherein the plurality of sensors comprise sensors that deform upon a physical separation of layers of the roof structure caused by the ice formation on the roof structure, the deformation of the sensors breaking a circuit of the sensors;
   detecting, using a processor, at least one sensor output indicative of ice formation, the at least one sensor output generated in response to the broken circuit, and generating a notification regarding the ice formation;
   providing, using an output device operatively coupled to the processor, a notification to an insurance carrier, the notification indicating the ice formation; and
   updating a status of the property in an insurance carrier database in response to the notification.

13. The computer implemented method of claim 12, further comprising:
   receiving, over the network communication link, third party data input regarding the property;
   monitoring, using a processor analyzing the third party data, other property characteristics of the property; and
   reporting, using an output device operatively coupled to a processor, the other property characteristics to the insurance carrier.

14. The computer implemented method of claim 12, further comprising:
   monitoring, using a processor, the plurality of sensors;
   determining, using a processor, an operability characteristic via monitoring of the plurality of sensors; and
   providing, using an output device operatively coupled to a processor, an operability notification in response to determining the operability characteristic indicates that at least one sensor is not operating;
   wherein the operability notification is communicated to an insurance carrier.

15. The computer implemented method of claim 12, wherein the sensors are smart nails.

16. The computer implemented method of claim 12, wherein the plurality of sensors disposed are installed by an installation tool that correlates each sensor with a location on the roof structure.

17. The computer implemented method of claim 12, wherein the ice formation relates to at least one of ice dams, wind, and snow.

* * * * *